United States Patent Office 3,021,299
Patented Feb. 13, 1962

3,021,299
BLOCK COPOLYMER OF A POLYAMINOTRIAZOLE AND AN AROMATIC POLYAMIDE, AND METHOD OF PREPARING SAME
William L. Evers, Summit, N.J., assignor to Celanese Corporation of America, New York, N.Y., a corporation of Delaware
No Drawing. Filed Jan. 30, 1959, Ser. No. 790,056
10 Claims. (Cl. 260—42)

This invention relates to polymeric materials and more particularly to polymeric materials which are especially suitable for the formation of filaments.

In synthetic fibers for textile use it is usually desirable to have certain properties such as high tenacity, high melting point and ease of dyeing. It is also often desirable to have stiffness in a fiber so that fabrics woven therefrom will be able to retain their shape or take a crease.

It is an object of this invention to provide new polymeric materials which are capable of producing fibers having an excellent balance of properties, especially including stiffness. Other objects will appear hereinafter.

The objects of this invention are achieved by preparing a block copolymer of a polyaminotriazole and a polyamide, said polyamide having the nitrogen atoms of its amide groups linked to aromatic nuclei in the chain by attachment of said nitrogen atoms to carbon atoms, all of whose valences are attached to atoms of the group consisting of carbon and hydrogen.

The block copolymers of this invention are prepared by heating a mixture of a polyaminotriazole with an amine-terminated polyamide, said polyamide having the nitrogen atoms of its amide groups linked to aromatic nuclei in the chain by attachment of said nitrogen atoms to carbon atoms, all of whose other valences are satisfied by atoms of the group consisting of carbon and hydrogen.

Polyaminotriazoles are suitably prepared by heating a mixture of a dihydrazide of a dicarboxylic acid with aqueous hydrazine hydrate. For a particular dihydrazide, the molecular weight of the product will depend upon the temperature of the reaction, the proportion of water and the duration of the reaction. Higher temperatures, lower proportions of water and longer reaction periods are conducive to higher molecular weights.

Polyamides suitable for use in this invention may be prepared by heating the salt of a dicarboxylic acid and a diprimary aromatic amine in the presence of an excess of the amine. Methods for preparing amine-terminated polyamides of predetermined molecular weight are well known to those skilled in the art. In general, the molecular weight will be a function of the purity of the reactants, the quantity of diamine used as stabilizer, the degree of completeness of removal of the water of reaction, and the temperature and duration of the reaction. The molecular weight is controlled most conveniently and most satisfactorily by means of the quantity of stabilizer used.

In general, it is preferred that the polyaminotriazole have a chain length of at least 20 monomeric units.

When the polyaminotriazoles are prepared by the reaction of the dihydrazide and aqueous hydrazine, the preferred conditions for obtaining a product of the molecular weight specified above include a temperature between about 190° and 230° C., an amount of hydrazine between about 5 and 10 percent by weight, based on the weight of the dihydrazide, an amount of water between about 10 and 30 percent, based on the weight of the dihydrazide and a reaction period between about 5 and 15 hours.

The preferred class of polyaminotriazoles are those having structural units of the formula

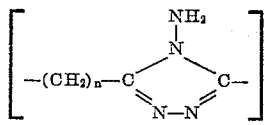

wherein $n$ is an integer from 6 to 12. They are prepared as described above, utilizing as reactants the dihydrazides of dialkanoic acids having from 8 to 14 carbon atoms. Among the preferred dihydrazides are sebacic dihydrazide, azelaic dihydrazide, suberic dihydrazide, adipic dihydrazide, methyl adipic dihydrazide, decanedioic dihydrazide and undecanedioic dihydrazide.

Other polyaminotriazoles which may be used contain structural units of the formula

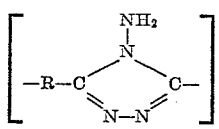

wherein R is a divalent organic radical free from reactive groups and having two terminal carbon atoms through which it is joined to the triazole rings. In addition to the preferred class of polyaminotriazoles described above, other polyaminotriazoles having the structure described immediately above may be prepared from the dihydrazides of acids such as the following:

Isophthalic acid
Terephthalic acid
Phenylene diacetic acids
Phenylene diproprionic acids
Phenylene dibutyric acids
p,p'-Dicarboxy-1,5-diphenoxypentane
p,p'-Dicarboxy-1,4-diphenoxybutane
p,p'-Dicarboxy-diphenoxymethane
p-Carboxy-5-phenoxymethyl pyromucic acid
Thio bis oenanthic acid
Thio bis caproic acid
Sulfone bis caproic acid
Thio bis valeric acid
Sulfone bis valeric acid
Thio bis propionic acid
Sulfone bis propionic acid
Thio bis butyric acid
Sulfone bis butyric acid
Thio bis acetic acid
Sulfone bis acetic acid
p,p'-Dicarboxy diphenyl
1,4-dicarboxynaphthalene
Pinic acid
Norpinic acid
Homopinic acid A suitable class of polyamides are those having the formula

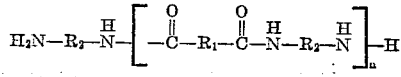

wherein $R_1$ is a divalent organic radical and $R_2$ is a divalent organic radical having terminal carbon atoms which are linked only to carbon atoms or hydrogen atoms and having an aromatic nucleus and where $n$ is an integer representing the degree of polymerization.

Polyamides of the structure described above are generally prepared by the reaction of a dicarboxylic acid with a predetermined excess of a diprimary aromatic amine to yield a polymer of desired molecular weight. Among the suitable diprimary aromatic amines which may be used are m-xylylene diamine, p-xylylene diamine, bis-β-aminoethyl benzene, bis-aminomethyl benzene, bis-β-aminoethyl durene, bis-aminomethyl durene, p,p'-diaminodiphenyl, p,p'-diaminomethyldiphenyl, p,p'-diaminoethyldiphenyl, 1,4-diaminonaphthalene, 1,4-diaminomethylnaphthalene, 1,4-diaminoethylnaphthalene, 1,6-diaminonaphthalene, 1,6-diaminomethylnaphthalene and 1,6-diaminoethylnaphthalene.

Among the suitable dicarboxylic acids which may be used are the dialkanoic acids, such as adipic, pimelic and suberic and aromatic acids such as isophthalic. The preferred dicarboxylic acids are the dialkanoic acids having from 6 to 10 carbon atoms.

In general, it is preferred that the polyamides have a molecular weight at least as high as that of the polyaminotriazoles. Polyamides of such molecular weights are preferably prepared by reacting the diamine-dicarboxyic acid salt with excess diamine under conditions well known in the art.

Polyaminotriazoles, suitable for use in accordance with this invention may be prepared in other ways, as for example by the reaction of one mole of a dicarboxylic acid with more than 2 moles of aqueous hydrazine.

Polyamides having the nitrogen atoms of their amide groups linked to aromatic nuclei in the chain by being attached to carbon atoms, all of whose other valences are satisfied by carbon or hydrogen atoms may also be prepared by the autocondensation of an aromatic amino-acid, including a treatment to change the carboxylic acid end of the polymer to an amine end. For example, m-aminomethylbenzoic acid may be condensed with itself, in the presence of about 1 mole percent of m-xylylene diamine to produce an amine-terminated polyamide.

The copolymers of this invention are prepared by linking the polyaminotriazole to the amine-terminated polyamide. Polyaminotriazoles, prepared as described above, have hydrazide end groups which link to the amine end groups of the polyamide.

The reaction is generally carried out by heating a mixture of the prepolymers. The prepolymers may be intimately mixed in pulverized state and heated to a temperature between about 5° and 15° C. above the melting point of the higher melting component, or the prepolymers may be dissolved in a common high boiling solvent and heated to reflux temperature.

The prepolymers are preferably blended in such proportions that there are more moles of the polyaminotriazole prepolymer in the reaction zone. The polyaminotriazole prepolymer is capable of reacting with itself to reduce the number of moles present during reaction. The polyamide being stabilized cannot react with itself but only with the polyaminotriazole prepolymer. Preferably between about 0.4 and 0.8 mole of polyamide prepolymer are used for each 1 mole of polyaminotriazole.

When the materials are heated in bulk, they are preferably heated under an inert gas, such as nitrogen. The reaction period is preferably between about 30 and 120 minutes.

When the materials are heated in solution, a solvent is selected which can maintain a relatively high solids concentration, such as between about 25% and 60% by weight, based on the entire weight of the solution. Among the suitable solvents are m-cresol and o-phenylphenol. The solution is maintained at reflux temperature for a period between about 12 and 48 hours.

The preparation of the prepolymers and their combination is as follows:

EXAMPLE I

Preparation of prepolymer of polyaminotriazole of sebacic acid 60.0 g. sebacic dihydrazide were heated in a glass lined autoclave with 13.0 g. of 25% hydrazine in water. The sample was heated for 6 hours at 220° C. and allowed to cool overnight. The resulting white solid was finely pulverized and thoroughly washed in a Waring Blendor with distilled water before finally filtering and drying under vacuum at 60° C.

Melting point=258° C.
Inherent viscosity=0.33 (measured in 0.2% by weight of solution in m-cresol at 25° C.).

EXAMPLE II

Preparation of prepolymer of m-xylylene-diamine adipate 60.0 g. of m-xylylenediammonium adipate salt, 0.4 ml. of m-xylylenediamine in 5 ml. of water were charged into a glass lined pipe autoclave. The autoclave was equipped with a pressure gauge and two valves that enabled the system to be kept under pressure or evacuated.

The autoclave was cleared of oxygen by flushing five times with nitrogen. The pressure was then set at 65 lbs. of nitrogen and the autoclave closed and placed in an oil bath at 240° C. After one hour at 240° C. under autogenous pressure the temperature was raised rapidly to 275° C. and held at this level for 2 hours. The pressure was slowly reduced to atmospheric and the autoclave heated an additional 3 hours. The resulting white, tough, opaque polymer had the following constants:

Melting point=240°–242° C.
Inherent viscosity=0.54 (measured as above).

EXAMPLE III

Preparation of prepolymer of p-xylylene-diamine sebacate 8 g. of p-xylylenediammonium salt and 0.25 g. of p-xylylene diamine were charged into a glass lined pipe autoclave. The autoclave was cleared of oxygen by flushing three times with nitrogen. The autoclave was immersed in an oil bath for one hour with the pressure permitted to rise to 65 p.s.i.g. The temperature was then raised to 290° C. over a period of 15 minutes and maintained at that level for an additional hour at a pressure permitted to rise to 85 p.s.i.g. The pressure was slowly released over a period of twenty minutes and the temperature was maintained at 290° at atmospheric pressure for an additional two hours. The resulting creamy-white polymer had the following constants:

Melting point=275–280° C.
Inherent viscosity=0.34 (measured as above).

EXAMPLE IV

Preparation of block copolyamides

Block copolymers were prepared by two different methods as described below:

(a) *Bulk method.*—The prepolymers were finely pulverized and intimately mixed in a glass tube that had a nitrogen inlet tube and could be evacuated.

The tube containing the two prepolymers was immersed in an oil bath at 260°–270° C. for 10 min. at atmospheric pressure under nitrogen, followed by heating for 1 hour at 4.0 mm. Hg pressure under nitrogen. The product was then cooled and examined.

(b) *Solvent polymerization.*—The two prepolymers were dissolved in m-cresol and brought to a reflux under nitrogen. The solution ocntained about 50–60% solids and was refluxed about 24 hours. After cooling, the solution was poured into acetone to precipitate the polymer and washed thoroughly with hot acetone until free of m-cresol. The results of the various trials are as follows:

| Properties of Prepolymer | | | Conditions of Polym. | Properties of Block Copolymer | |
|---|---|---|---|---|---|
| Composition, pts. | M.Pt., °C. | I.V.[a] | | M.Pt. | I.V. |
| MXD-6 [b] ........ 9.0 | 242 | 0.54 | Method (a)_ | 234 | 0.53 |
| PAT [c] .......... 1.0 | 258 | 0.33 | | | |
| MXD-6 .......... 9.0 | 242 | 0.54 | Method (b)_ | 226 | 0.71 |
| PAT ............. 1.0 | 258 | 0.33 | | | |
| MXD-6 .......... 7.5 | 242 | 0.54 | Method (a)_ | 236-40 | 0.65 |
| PAT ............. 2.5 | 258 | 0.33 | | | |
| PXD-10 [d] ...... 7.0 | 275-280 | 0.34 | 10' at 300° atm.p. | 255-268 | 0.9 |
| PAT ............. 3.0 | 258 | 0.33 | 45' at 290 at 2.0 mm. | | |

[a] Measured in 0.2 wt% solution of m-cresol at 25° C.
[b] MXD-6 indicates the prepolymer prepared from m-xylylene diammonium adipate according to Example II.
[c] PAT indicates the prepolymer prepared from sebacic dihydrazide according to Example I.
[d] PXD-10 indicates the prepolymer prepared from p-xylylene diammonium sebacate according to Example III.

All of the above block copolymers were fiber producing. The polymer produced from the prepolymers of Examples I and II by method (a) produced evceptionally tough fibers.

It is to be understood that the foregoing detailed description is given merely by way of illustration and that many variations may be made therein without departing from the spirit of my invention.

Having described my invention, what I desire to secure by Letters Patent is:

1. A block copolymer of a polyaminotriazole having a chain length of at least 20 monomeric units and an amine-terminated polyamide, said polyamide having a molecular weight of at least as high as that of the polyaminotriazole, and having the nitrogen atoms of its amide groups linked to aromatic nuclei in the chain by attachment of said nitrogen atoms to carbon atoms, all of whose other valences are satisfied by atoms of the group consisting of carbon and hydrogen.

2. A block copolymer according to claim 1 wherein said polyaminotriazole has an inherent viscosity of at least about 0.33.

3. The method of forming a block copolymer which comprises heating a mixture of a polyaminotriazole having a chain length of at least 20 monomeric units and an amine-terminated polyamide, said polyamide having a molecular weight at least as high as that of the polyaminotriazole and having the nitrogen atoms of its amide groups linked to aromatic nuclei in the chain by attachment of said nitrogen atoms to carbon atoms, all of whose other valences are satisfied by atoms of the group consisting of carbon and hydrogen.

4. The method of claim 3 in which said mixture is a pulverized mixture.

5. The method of claim 3 in which said mixture is a solution.

6. The method of claim 3 in which said polyaminotriazole contains the structure

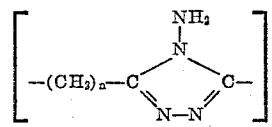

wherein $n$ is an integer from 6 to 12.

7. The method of claim 6 wherein $n$ is 8.

8. The method of claim 3 wherein said polyamide is the condensation product of adipic acid with an excess of m-xylylene diamine.

9. The method of claim 3 wherein said polyamide is the condensation product of adipic acid with an excess of p-xylylene diamine.

10. The method of claim 3 wherein said polyaminotriazole has an inherent viscosity of at least about 0.33.

References Cited in the file of this patent

UNITED STATES PATENTS

| 2,193,529 | Coffman | Mar. 12, 1940 |
| 2,395,642 | Prichard | Feb. 26, 1946 |
| 2,512,627 | Fisher et al. | June 27, 1950 |